United States Patent [19]

Baudard et al.

[11] 4,183,022
[45] Jan. 8, 1980

[54] TRANSPONDER FOR RADIOCOMMUNICATION SYSTEM, PARTICULARLY FOR MEASURING THE DISTANCE BETWEEN TWO STATIONS

[75] Inventors: Thierry Baudard, Paris; Max Schumperli, Bailey; Alain Pouzet, Castanet, all of France

[73] Assignee: Electronique Marcel Dassault, Paris, France

[21] Appl. No.: 803,115

[22] Filed: Jun. 2, 1977

[30] Foreign Application Priority Data

Jun. 3, 1976 [FR] France .................... 76 16808

[51] Int. Cl.² ............................................. G01S 9/56
[52] U.S. Cl. ............................ 343/6.8 R; 325/17; 325/419
[58] Field of Search .............. 325/3, 7, 8, 17, 47, 325/48, 50–61, 346, 63, 418–421; 343/5 AF, 6.5 SS, 6.8 R, 14, 17.5, 6.5 R; 340/152 T

[56] References Cited

U.S. PATENT DOCUMENTS

| | | | |
|---|---|---|---|
| 3,290,677 | 12/1966 | Jacob | 343/6.5 R |
| 3,343,163 | 9/1967 | Crooks, Jr. et al. | 343/6.5 R |
| 3,537,017 | 10/1970 | Judge | 325/419 |
| 3,683,279 | 8/1972 | Weinberg et al. | 325/420 |
| 3,769,589 | 10/1973 | Buntschuh et al. | 325/419 |
| 3,860,921 | 1/1975 | Wood | 343/6.5 R |
| 3,983,501 | 9/1976 | Lindstrum | 325/419 |

FOREIGN PATENT DOCUMENTS 1247035  8/1967  Fed. Rep. of Germany .

Primary Examiner—Robert L. Richardson
Assistant Examiner—Jin F. Ng
Attorney, Agent, or Firm—Karl F. Ross

[57] ABSTRACT

A system for measuring the distance between an interrogating station and a transponder station comprises, at the latter station, a receiver for a phase-modulated UHF wave emitted by the interrogating station and a transmitter for sending back an outgoing main carrier modulated in phase by a locally generated subcarrier. A first oscillator generates a wave whose frequency is a subharmonic of the frequencies of both the incoming and the outgoing main carrier and from which there are derived, besides this outgoing carrier, a heterodyning oscillation and a reference oscillation which are both amplitude-modulated by the output of a second oscillator whose frequency matches that of the incoming subcarrier and which also serves as a source of the locally generated outgoing subcarrier. The amplitude-modulated heterodyning oscillation is mixed with the incoming carrier wave to produce an i-f oscillation with a central frequency matching that of the reference oscillation and with two pairs of sidebands respectively due to the phase modulation of the incoming carrier and to the amplitude modulation of the heterodyning oscillation. The first oscillator is provided with a phase-locking loop including a phase comparator which receives the i-f oscillation and the amplitude-modulated reference oscillation; the same i-f oscillation, freed from its sidebands, is compared with the unmodulated reference oscillation to yield a corrective signal for adjusting the frequency and phase of the second oscillator.

5 Claims, 6 Drawing Figures

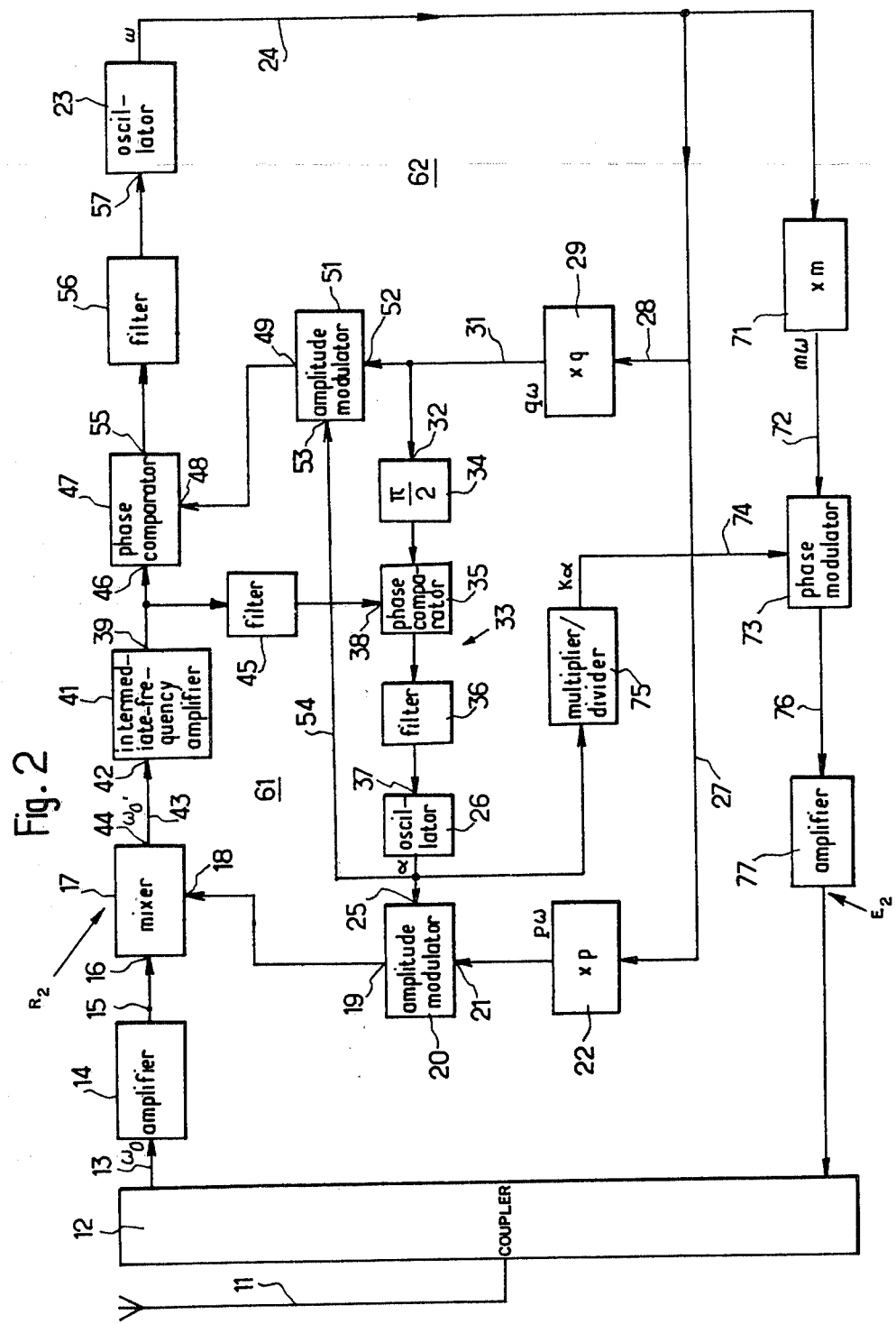

TRANSPONDER FOR RADIOCOMMUNICATION SYSTEM, PARTICULARLY FOR MEASURING THE DISTANCE BETWEEN TWO STATIONS

FIELD OF THE INVENTION

Our present invention relates to a transponder station of a radiocommunication system, especially for the radio-electric measurement of distances.

BACKGROUND OF THE INVENTION

In order to determine the distance between two stations, the time taken by radio waves to travel from an interrogating to a responding station and back is measured at the interrogating station.

In certain installations, the radio signal emitted by the interrogating station is simply reflected back by the responding station.

In other installations, the radio wave emitted by the interrogating station triggers, on its arrival at the other station termed a transponder, the emission of radio signals traveling in the opposite direction. In these latter installations, the accuracy of the measurement depends on the constancy of the time elapsing between the arrival of the radio signals emitted by the interrogating station at the transponder station and the retransmission of the response signals by the transponder.

However, the electronic transponder components provided for receiving and treating the incoming signals and for controlling the retransmission have characteristics which vary with time, with temperature or with other factors. Thus, even the use of components of high quality does not make it possible to eliminate the resulting variation in the intervening time lag.

This problem is aggravated by the fact that the signals received at the transponder station are affected by noise so that, if retransmission is to be carried out with relatively low energy, it is necessary to use transponder components with a narrow bandwidth, which are particularly sensitive to interference factors.

OBJECT OF THE INVENTION

The object of our invention is to provide means at such a transponder station for obviating these difficulties.

SUMMARY OF THE INVENTION

According to our invention, the emission from the transponder station is controlled by means of the signals arriving there from the interrogating station so that the signals emitted by the transponder, to be evaluated at the interrogating station, are freed of undesired variations due to the peculiarities of the transponder components.

In the case where the transmission between the two stations takes place with the aid of a main carrier wave modulated by an auxiliary carrier wave or subcarrier, our invention provides that both the frequency and the phase of the main carrier and of the subcarrier transmitted by the transponder station are adjusted by the signals which the transponder receives from the interrogating station.

For this purpose, a first oscillator at the transponder station has an output circuit with several branches, including respective frequency multipliers, which produce the outgoing main carrier as well as a heterodyning oscillation and a reference oscillation whose frequencies add up to the frequency of the incoming main carrier. A second oscillator at the transponder station generates an output oscillation of lower frequency, corresponding to that of the incoming subcarrier, which amplitude-modulates the heterodyning and reference oscillations derived from the first oscillator and which is also used—directly or after frequency division or multiplication—as a subcarrier phase-modulating the outgoing main carrier. The first oscillator is provided with a phase-locking loop including a first phase comparator which receives, on the one hand, the amplitude-modulated reference oscillation and, on the other hand, an i-f oscillation of the same frequency appearing in the output of a mixer to which the incoming phase-modulated main carrier and the amplitude-modulated heterodyning oscillation are fed; a second phase comparator lies in a control loop for the second oscillator and receives, on the one hand, the same i-f oscillation without its sidebands and, on the other hand, the unmodulated reference oscillation. To this end, an input of the second phase comparator is connected to a point of the corresponding output-circuit branch of the first oscillator lying between the frequency multiplier thereof and an associated amplitude modulator downstream of that multiplier, this connection preferably including a 90° phase shifter, while another input is connected to the mixer output through a filter.

The i-f oscillation fed to one of the inputs of the first phase comparator contains two pairs of sidebands due, respectively, to the phase modulation of the incoming main carrier and to the amplitude modulation of the heterodyning oscillation. As long as the second oscillator operates at the frequency of the incoming subcarrier and in phase therewith, the phase of the i-f oscillation in that comparator input varies symmetrically about a mean value of zero; since the reference oscillation derived from the first oscillator undergoes a like amplitude modulation but no phase modulation before reaching the other input of the phase comparator controlling this oscillator, the latter will not receive an error signal under equilibrium conditions and its own phase will not change so that the second phase comparator in the control loop for the second oscillator will tend to maintain the operating frequency and phase thereof at its current value. If, however, the first comparator detects a dissymmetry in the phase modulation of the i-f oscillation generated by the mixer, it readjusts the first oscillator and thus alters the phasing of the signals supplied to the second comparator with resulting readjustment of the second oscillator until equilibrium is restored.

A particularly interesting field of application for our improved radiocommunication system is the measurement of distance between an artificial earth satellite, acting as the interrogating station, and a surface beacon serving as the transponder station.

BRIEF DESCRIPTION OF THE DRAWING

The above and other features of our invention will now be described in detail with reference to the attached drawing in which:

FIG. 2 is a more detailed block diagram of the transponder station of FIG. 1.

SPECIFIC DESCRIPTION

Figure 1:
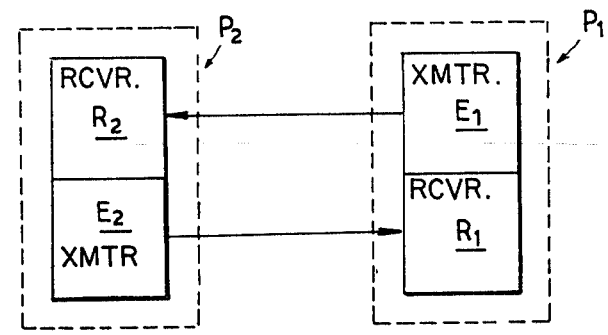
FIG. 1 is a very schematic view of a distance-measuring system according to the invention, including an interrogating station and a transponder station.

The system shown in FIG. 1 is intended to carry out the measurement of the distance between an interrogating station (e.g. a satellite) $P_1$ and a transponder station $P_2$ (e.g. a beacon).

The interrogating station $P_1$ comprises a transmitter $E_1$ and a receiver $R_1$.

The transponder station $P_2$ comprises a receiver $R_2$ and a transmitter $E_2$.

The transmitter $E_1$ of station $P_1$ emits a sinusoidal main carrier, for example an ultrahigh-frequency wave of angular frequency or pulsatance $\omega_0$, modulated in phase by a high-frequency auxiliary carrier or subcarrier. The transmitter $E_2$ of the station $P_2$, whose operation depends on the reception of the signals coming in from station $P_1$ to the station $P_2$, sets out an ultrahigh-frequency main carrier, of a frequency which differs from that of the main carrier emitted by the station $P_1$, modulated in phase by a locally generated auxiliary high-frequency carrier or subcarrier.

When the interrogating station $P_1$ receives the phase-modulated ultrahigh-frequency signals of transmitter $E_2$, the distance between stations $P_1$ and $P_2$ is determined at the station $P_1$ by comparing the signals received at the station $P_1$ from the station $P_2$ with the signals which this station $P_1$ emits.

Figure 3A:
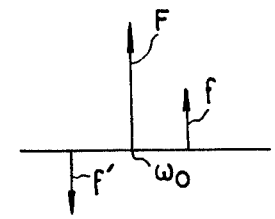
FIGS. 3a–3d schematically show various signal spectra.

The transponder station $P_2$ comprises a receiving and transmitting antenna 11 (FIG. 2) and a coupler 12 directing the signals picked up by the antenna 11 to an input channel 13. The latter comprises an amplifier 14 at whose output 15 the incoming signals have a frequency spectrum which is shown schematically in FIG. 3a. This spectrum comprises a vector F, representing the ultrahigh-frequency carrier wave of angular frequency $\omega_0$ received by the station $P_2$, and two vectors f and f′ which have the same magnitude but opposite directions; they constitute the sidebands due to the phase modulation by the auxiliary carrier and are located on opposite sides of the vector F at a distance from the latter which represents the frequency of the auxiliary carrier, for example 1 MHz.

The output signals of amplifier 14, i.e. wave $\omega_0$ and it sidebands, are applied to the first input 16 of a mixer 17 whose second input 18 is connected to the output 19 of an amplitude modulator 20. A heterodyning oscillation of pulsatance $p\omega$ issues from a frequency multiplier 22 multiplying by a factor P the pulsatance $\omega$ of a quartz-controlled oscillator 23, and is applied to a first input 21 of modulator 20. The variable-frequency oscillator 23 serves to supply main carrier of pulsatance $m\omega$, emitted by station $P_2$, and is of the voltage-controlled (VCO) type. Its nominal pulsatance $\omega$ is equal to $(\omega_0/p+q)$, q being another constant.

Another input 25 of the modulator 20 receives a high-frequency wave $\alpha$ from a second voltage-controlled quartz oscillator 26 which supplies a subcarrier $k\alpha$ for phase modulating the carrier $m\omega$ emitted from station $P_2$. The output circuit 24 of the oscillator 23 divides into a first branch 27 extending to the input of the frequency multiplier 22 and a second branch 28 extending to the input of another frequency multiplier 29 which introduces the constant q as a multiplying factor. The output 31 of the frequency multiplier 29, carrying a reference wave $q\omega$, is connected to the input 32 of a circuit 33 which controls the frequency and phase of oscillator 26 and which comprises several cascaded elements including a phase shifter 34 introducing a phase shift of $\pi/2$, a phase comparator 35, and a filter 36 whose output is connected to a control input 37 of oscillator 26. The filter 36 eliminates, on the one hand, the undesirable frequency components from the output of the phase comparator 35 and, on the other hand, stabilizes the operating conditions of a control loop 61 which includes the oscillator 26 along with part of circuit 33.

The second input 38 of the phase comparator 35 is connected to the output 39 of an intermediate-frequency amplifier 41 whose input 42 is connected by a circuit 43 to the output 44 of the mixer 17 to receive therefrom an oscillation $\omega_0'$. A filter 45 is interposed between the amplifier 41 and the phase comparator 35.

The output 39 of the i-f amplifier 41 is also connected to an input 46 of another phase comparator 47, having a further input 48 connected to the output 49 of a second amplitude modulator 51 whose input 52 receives the reference oscillation $q\omega$ from the output 31 of the frequency multiplier 29. The modulation signal $\alpha$ applied to the second input 53 of the modulator 51 comes via a circuit 54 from the output of the high-frequency oscillator 26.

The output 55 of the phase comparator 47 is connected via a filter 56 to the control input 57 for the frequency and phase adjustment of the oscillator 23 via a phase-locking loop 62.

The oscillation $\omega$ present on line 24 is fed, after its frequency has been raised to the UHF range through multiplication by a factor m in a multiplier 71, to the input 72 of a phase modulator 73 whose other input 74 is connected to the output of the second oscillator 26, a frequency multiplier or divider 75 being optionally interposed to establish the desired pulsatance $k\alpha$ for the outgoing subcarrier. The output 76 of the phase modulator 73 extends, via an interposed amplifier 77, to the coupler 12 which directs the outgoing UHF carrier, $m\omega$, modulated in phase by the subcarrier $k\alpha$, to the antenna 11.

Operation is as follows:

The incoming ultrahigh-frequency wave of pulsatance $\omega_0$, modulated in phase by the high-frequency subcarrier represented by sidebands f and f′, is picked up by the antenna 11 and then amplified by the amplifier 14 which can have a large bandwidth and is thus virtually insensitive to interference factors liable to affect its transit time. The signals coming from the amplifier 14 are applied to the input 16 of the mixer 17 which receives, at its input 18, the heterodyning wave $p\omega$ coming from the amplitude modulator 20. The angular frequency of this heterodyning wave has a value of:

$$p\omega = (p/p+q)\omega_0$$

Figure 3B:
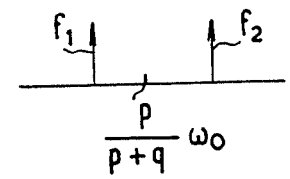

This wave is amplitude-modulated by the sinusoidal wave $\alpha$ supplied by the oscillator 26, assumed to have a frequency of 1 MHz. The spectrum of the signals present at the output 19 of the amplitude modulator 20 is shown in FIG. 3b as including vectors $f_1$ and $f_2$ of equal magnitude and equal distance from the frequency corresponding to pulsatance $p\omega$.

Figure 3C:
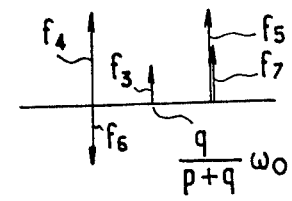

The spectrum of the signals present at the output 44 of the mixer 17 is shown in FIG. 3c. It comprises a vector $f_3$ representing a pulsatance $\omega_0 - p\omega = \omega_0' = (q/p+q)\omega_0$. This spectrum further contains two codirectional vectors $f_4$ and $f_5$ which are on opposite side of the vector $f_3$ and equidistant from the latter, here by 1 MHz, and which are the sidebands due to the amplitude modulation. The spectrum likewise contains two oppositely pointing vectors $f_6$ and $f_7$ which are on respective sides of the vector $f_3$ and equidistant therefrom, here again by 1 MHz, representing the sidebands due to the phase modulation.

After amplification in the intermediate-frequency amplifier 41, the signals centered on pulsatance $\omega_O'$ are applied on the one hand to the input 38 of the phase comparator 35 via the filter 45 which passes only the central frequency $f_3$ of the diagram of FIG. 3c and, on the other hand, to the input 46 of the phase comparator 47.

Figure 3D:
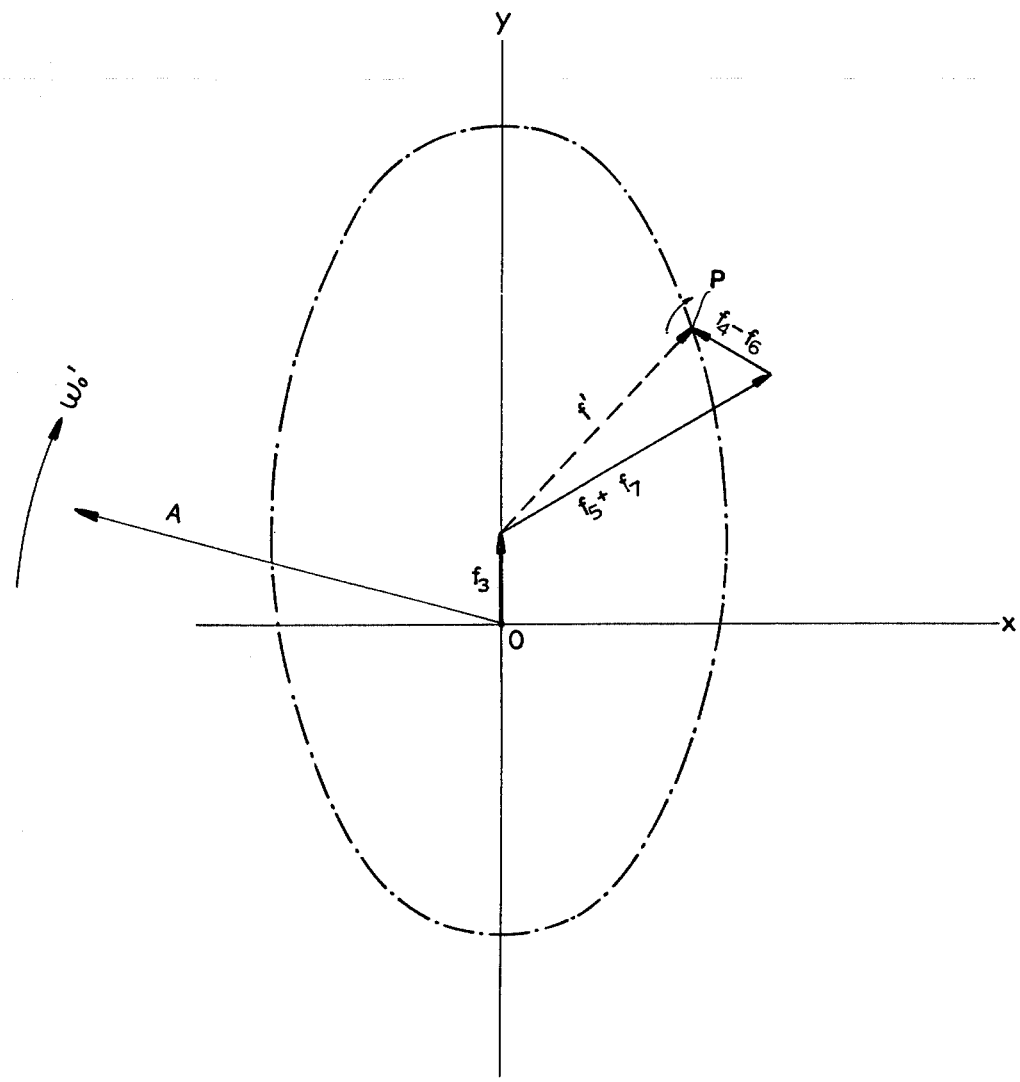

In FIG. 3d we have shown the vectors $f_3$–$f_7$ of FIG. 3c in their relative position at a particular point of a cycle of i-f carrier $f_3$ whose vector is stationary on the y axis of a conventional x-y diagram, with the time axis A rotating about the origin O at the angular velocity $\omega_O'$ of that vector. Another vector, rotating counterclockwise, represents the sum of the two cophasal vectors $f_5$ and $f_7$ of the two upper sidebands while a further vector, rotating clockwise, represents the difference of the two antiphasal vectors $f_4$ and $f_6$. As long as the two pairs of sidebands $f_4$, $f_5$ (resulting from the amplitude modulation of heterodyning oscillation $p\omega$) and $f_6$, $f_7$ (resulting from the phase modulation of the incoming carrier wave $\omega_O$) are aligned as shown in FIG. 3c, a point P at the end of the resulting vector $f''$ will trace an ellipse symmetrical about axis y; if vectors $f_4$, $f_5$ were of the same magnitude as vectors $f_6$, $f_7$, that ellipse would turn into a circle of radius $2f_4$. The signals appearing at the comparator input 46, conforming to the sum of vectors $f_3$ and $f''$, will therefore be the carrier $f_3$ modulated in both amplitude and phase, the latter modulation having a mean value of zero under the assumed circumstances.

With the system in equilibrium, the reference oscillation $q\omega$ issuing from multiplier 29 is of the same frequency as i-f oscillation $\omega_O'$ and in phase with its vector $f_3$. As both oscillations are amplitude-modulated by the same lower-frequency wave $\alpha$ generated by oscillator 26, comparator 47 will only detect a phase difference whose mean value is zero so that no error signal is delivered via filter 56 to the control input 57 of oscillator 23. Comparator 35, to which the two unmodulated oscillations of frequency $f_3$ are delivered in relative quadrature on account of phase shifter 34, will then have a steady output signal keeping the oscillator 26 operating at the proper frequency and phase.

If the sideband vectors of FIG. 3c are disaligned for any reason, the ellipse shown in FIG. 3d will change its orientation relative to vector $f_3$ so as to be no longer bisected by axis y. The resulting unbalance in the phasing of the signals at comparator input 46 causes the transmission of an error signal by way of filter 56 to oscillator 23 so that the phae of oscillation $\omega$ (subharmonically related to the incoming carrier wave $\omega_O$) is shifted. Comparator 35, reacting to this phase shift, then modifies the phase of oscillator 26 in a sense tending to restore the aforedescribed equilibrium. Such a corrective action would also occur if the oscillator 23 shifted its phase so that the central frequency components of the signals applied to comparator inputs 46 and 48 would no longer be cophasal.

Thus, the outgoing carrier $m\omega$ and the associated subcarrier $k\alpha$ are stabilized in both frequency and phase by the incoming phase-modulated carrier wave $\omega_O$.

The phase modulation of the station $P_2$ can differ from that introduced by the incoming subcarrier received from the other station $P_1$.

The invention can also be used in the case where the station $P_2$ comprises means for generating several auxiliary carriers, with control of the frequency and phase of the locally generated auxiliary carriers by an incoming subcarrier. The system may operate to eliminate phase differences between these locally generated subcarriers and the incoming subcarrier, or to measure such differences.

The subcarriers used for phase modulation need not be sinusoidal but could be of some other type, for example square, provided that the modulation has a mean value of zero.

We claim:

1. In a radiocommunication system including an interrogating station transmitting a phase-modulated UHF carrier wave and a transponder station responsive to said carrier wave for sending back a main UHF carrier phase-modulated by a locally generated subcarrier, the improvement wherein said transponder station comprises:

oscillation-generating means including a first voltage-controlled oscillator for producing said main UHF carrier;

a subcarrier source including a second voltage-controlled oscillator;

receiving means for intercepting an incoming UHF carrier wave transmitted by said interrogating station;

circuit means with two branches connected to said first oscillator for respectively producing in one of said branches a heterodyning oscillation and in the other of said branches a reference oscillation with frequencies whose sum equals the frequency of said incoming carrier wave;

amplitude-modulating means connected to said branches and to said second oscillator for modulating the amplitudes of said heterodyning oscillation and of said reference oscillation with an output oscillation of said second oscillator, said output oscillation having a frequency equaling the phase-modulation frequency of said incoming carrier wave;

mixer means with inputs connected to said one of said branches and to said receiving means for deriving from said incoming carrier wave and from the amplitude-modulated heterodyning oscillation a phase-modulated and amplitude-modulated i-f oscillation having the same frequency as said reference oscillation;

first phase-comparison means with input connections to said mixer means and to said other of said branches for detecting phase difference between said i-f oscillation and said reference oscillation and for deriving therefrom an error signal fed to said first oscillator for introducing compensatory phase changes in said heterodyning and reference oscillations;

filter means connected to said mixer means for suppressing the sidebands due to the phase and amplitude modulations of said i-f oscillation;

second phase-comparison means with an output connection to said second oscillator and with input connections to said filter means and to said other of said branches for receiving therefrom said i-f oscillation and said reference oscillation in substantially unmodulated form and for deriving from their phase difference a corrective signal controlling the phase of said output oscillation;

phase-modulating means connected to said oscillation-generating means and to said subcarrier source for producing a phase-modulated outgoing UHF carrier stabilized to frequency and phase by said incoming carrier wave; and transmitting means connected to said phase-modulating means for emitting said outgoing carrier.

2. The improvement defined in claim 1 wherein said first oscillator has an operating frequency subharmonically related to the frequency of said incoming carrier wave, said branches including respective frequency multipliers.

3. The improvement defined in claim 2 wherein said amplitude-modulating means comprises an amplitude modulator in each of said branches downstream of the respective frequency multiplier.

4. The improvement defined in claim 3 wherein one input connection of said second phase-comparison means extends from a point of said other of said branches located between the frequency multiplier and the amplitude modulator thereof.

5. The improvement defined in claim 4 wherein said one input connection includes a 90° phase shifter.

* * * * *